(12) United States Patent
Monkowski et al.

(10) Patent No.: US 9,983,595 B2
(45) Date of Patent: *May 29, 2018

(54) METHOD AND APPARATUS FOR GAS FLOW CONTROL

(71) Applicant: Pivotal Systems Corporation, Fremont, CA (US)

(72) Inventors: Adam J. Monkowski, Pleasanton, CA (US); Jialing Chen, Palo Alto, CA (US); Tao Ding, San Leandro, CA (US); Joseph R. Monkowski, Danville, CA (US)

(73) Assignee: PIVOTAL SYSTEMS CORPORATION, Fremont, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/342,067

(22) Filed: Nov. 2, 2016

(65) Prior Publication Data

US 2017/0052546 A1    Feb. 23, 2017

Related U.S. Application Data

(62) Division of application No. 14/475,494, filed on Sep. 2, 2014, now Pat. No. 9,523,435, which is a division (Continued)

(51) Int. Cl.
*G05D 7/06* (2006.01)
*F16K 7/16* (2006.01)
(Continued)

(52) U.S. Cl.
CPC ............ *G05D 7/0635* (2013.01); *F16K 7/14* (2013.01); *F16K 7/16* (2013.01); *F16K 31/004* (2013.01);
(Continued)

(58) Field of Classification Search
CPC ........ F16K 31/004; F16K 31/006; F16K 7/14; F16K 7/16; G05D 7/0635;
(Continued)

(56) References Cited

U.S. PATENT DOCUMENTS 4,114,419 A    9/1978 Kimbell
4,285,245 A    8/1981 Kennedy
(Continued)

FOREIGN PATENT DOCUMENTS

CN    1739072 A    2/2006
CN    1839358 A    9/2006
(Continued)

OTHER PUBLICATIONS

Office Action for Chinese Patent Application No. 201510068328.1 dated Aug. 31, 2016.
(Continued)

*Primary Examiner* — William McCalister
(74) *Attorney, Agent, or Firm* — Womble Bond Dickinson (US) LLP; Joseph Bach, Esq.

(57) ABSTRACT

A method and apparatus for self-calibrating control of gas flow. The gas flow rate is initially set by controlling, to a high degree of precision, the amount of opening of a flow restriction, where the design of the apparatus containing the flow restriction lends itself to achieving high precision. The gas flow rate is then measured by a pressure rate-of-drop upstream of the flow restriction, and the amount of flow restriction opening is adjusted, if need be, to obtain exactly the desired flow.

20 Claims, 13 Drawing Sheets

Related U.S. Application Data of application No. 12/906,058, filed on Oct. 15, 2010, now abandoned.

(60) Provisional application No. 61/252,143, filed on Oct. 15, 2009.

(51) Int. Cl.
*F16K 7/14* (2006.01)
*F16K 31/00* (2006.01)

(52) U.S. Cl.
CPC ........ *F16K 31/006* (2013.01); *Y10T 137/0379* (2015.04); *Y10T 137/0396* (2015.04); *Y10T 137/7737* (2015.04); *Y10T 137/7759* (2015.04); *Y10T 137/7761* (2015.04); *Y10T 137/8158* (2015.04); *Y10T 137/8242* (2015.04); *Y10T 137/8275* (2015.04)

(58) Field of Classification Search
CPC ......... Y10T 137/0379; Y10T 137/0396; Y10T 137/7737; Y10T 137/7759; Y10T 137/7761; Y10T 137/8158; Y10T 137/8242; Y10T 137/8275
See application file for complete search history.

(56) References Cited

U.S. PATENT DOCUMENTS

| | | |
|---|---|---|
| 4,560,871 A | 12/1985 | Bowman et al. |
| 4,617,952 A | 10/1986 | Fujiwara et al. |
| 4,695,034 A | 9/1987 | Shimizu et al. |
| 5,062,446 A | 11/1991 | Anderson |
| 5,092,360 A | 3/1992 | Watanabe et al. |
| 5,094,430 A | 3/1992 | Shirai et al. |
| 5,142,781 A | 9/1992 | Mettner et al. |
| 5,145,147 A | 9/1992 | Nakazawa et al. |
| 5,154,206 A | 10/1992 | Gillott et al. |
| 5,161,774 A | 11/1992 | Engelsdorf et al. |
| 5,224,843 A | 7/1993 | van Lintel |
| 5,238,223 A | 8/1993 | Mettner et al. |
| 5,388,984 A | 2/1995 | Meslif |
| 5,497,804 A | 3/1996 | Codina et al. |
| 5,566,710 A | 10/1996 | Dahlgren et al. |
| 5,593,134 A | 1/1997 | Steber et al. |
| 5,624,409 A | 4/1997 | Seale |
| 5,647,574 A | 7/1997 | Mettner et al. |
| 5,684,245 A | 11/1997 | Hinkle |
| 5,730,861 A | 3/1998 | Sterghos et al. |
| 5,762,086 A | 6/1998 | Ollivier |
| 5,785,087 A | 7/1998 | Takahashi et al. |
| 5,787,915 A | 8/1998 | Byers et al. |
| 5,839,467 A | 11/1998 | Saaski et al. |
| 5,856,743 A | 1/1999 | Juniman |
| 5,865,205 A | 2/1999 | Wilmer |
| 5,868,159 A | 2/1999 | Loan et al. |
| 5,925,829 A | 7/1999 | Laragione et al. |
| 5,926,955 A | 7/1999 | Kober |
| 5,942,892 A | 8/1999 | Li |
| 5,950,652 A | 9/1999 | Morgan |
| 5,997,280 A | 12/1999 | Welz, Jr. et al. |
| 6,062,256 A | 5/2000 | Miller et al. |
| 6,113,695 A | 9/2000 | Fujimoto |
| 6,119,710 A | 9/2000 | Brown |
| 6,138,708 A | 10/2000 | Waldbusser |
| 6,142,444 A | 11/2000 | Kluge |
| 6,172,445 B1 * | 1/2001 | Heinz ................ F02M 47/027 310/328 |
| 6,182,941 B1 | 2/2001 | Scheuerbrand et al. |
| 6,216,726 B1 | 4/2001 | Brown et al. |
| 6,230,731 B1 | 5/2001 | Miller et al. |
| 6,230,738 B1 | 5/2001 | Watanabe et al. |
| 6,240,962 B1 | 6/2001 | Tai et al. |
| 6,244,296 B1 | 6/2001 | Lafler et al. |
| 6,247,493 B1 | 6/2001 | Henderson |
| 6,267,146 B1 | 7/2001 | Miyazoe et al. |
| 6,276,385 B1 | 8/2001 | Gassman |
| 6,321,781 B1 | 8/2001 | Kurth |
| 6,363,958 B1 | 4/2002 | Ollivier |
| 6,363,959 B1 | 4/2002 | Ollivier |
| 6,382,226 B1 | 5/2002 | Larson et al. |
| 6,412,444 B1 | 7/2002 | Esham |
| 6,450,200 B1 | 9/2002 | Ollivier |
| 6,460,567 B1 | 10/2002 | Hansen, III et al. |
| 6,519,508 B1 | 2/2003 | Saito |
| 6,520,479 B1 | 2/2003 | Saito |
| 6,539,968 B1 | 4/2003 | White et al. |
| 6,581,623 B1 | 6/2003 | Carpenter et al. |
| 6,627,465 B2 | 9/2003 | Sandhu et al. |
| 6,648,019 B2 | 11/2003 | Gagnon |
| 6,761,063 B2 | 7/2004 | Mengle |
| 6,782,906 B2 | 8/2004 | Chang |
| 6,811,136 B2 | 11/2004 | Eberhardt et al. |
| 6,932,098 B2 | 8/2005 | Shajii et al. |
| 6,948,508 B2 | 9/2005 | Shajii et al. |
| 6,955,072 B2 | 10/2005 | Zarkar et al. |
| 6,968,859 B1 | 11/2005 | Nagano et al. |
| 7,077,379 B1 * | 7/2006 | Taylor ................ F02M 51/0603 239/102.2 |
| 7,089,134 B2 | 8/2006 | Barros et al. |
| 7,136,767 B2 | 11/2006 | Shajii et al. |
| 7,174,263 B2 | 2/2007 | Shajii et al. |
| 7,204,158 B2 | 4/2007 | Morgan et al. |
| 7,283,894 B2 | 10/2007 | Esposito et al. |
| 7,412,986 B2 | 8/2008 | Tison et al. |
| 7,569,049 B1 | 8/2009 | Blischak |
| 7,809,473 B2 | 10/2010 | Shajii et al. |
| 7,823,436 B2 | 11/2010 | Monkowski et al. |
| 7,875,398 B2 | 1/2011 | Kokubo |
| 7,882,852 B2 | 2/2011 | Coakley et al. |
| 7,918,238 B2 | 4/2011 | Tanaka et al. |
| 7,992,395 B2 | 8/2011 | Zhang et al. |
| 8,240,324 B2 | 8/2012 | Monkowski et al. |
| 8,265,888 B2 | 9/2012 | Chung et al. |
| 8,271,210 B2 | 9/2012 | Chung et al. |
| 8,271,211 B2 | 9/2012 | Chung et al. |
| 8,667,830 B2 | 3/2014 | Monkowski et al. |
| 8,757,197 B2 | 6/2014 | Hirata et al. |
| 8,857,456 B2 | 10/2014 | Monkowski et al. |
| 9,400,004 B2 | 7/2016 | Monkowski et al. |
| 2001/0038083 A1 | 11/2001 | Sakurai |
| 2002/0108652 A1 | 8/2002 | Palmer |
| 2003/0010948 A1 | 1/2003 | Horiuchi et al. |
| 2003/0159735 A1 | 8/2003 | Barillot et al. |
| 2003/0172975 A1 | 9/2003 | Gilbert et al. |
| 2003/0222236 A1 | 12/2003 | Eberhardt et al. |
| 2005/0199301 A1 | 9/2005 | Frisch |
| 2005/0221147 A1 * | 10/2005 | Shioya ................ F16K 31/004 429/443 |
| 2006/0006484 A1 | 1/2006 | Seneviratne et al. |
| 2006/0278276 A1 | 12/2006 | Tanaka et al. |
| 2007/0044851 A1 | 3/2007 | Gilbert et al. |
| 2007/0219650 A1 | 9/2007 | Wang et al. |
| 2007/0241296 A1 | 10/2007 | Prieto Barranco et al. |
| 2008/0173010 A1 | 7/2008 | Suresh et al. |
| 2009/0183548 A1 | 7/2009 | Monkowski et al. |
| 2009/0183549 A1 | 7/2009 | Monkowski et al. |
| 2009/0266139 A1 | 10/2009 | Gregor et al. |
| 2010/0243076 A1 | 9/2010 | Hayashi |
| 2011/0011183 A1 | 1/2011 | Monkowski et al. |
| 2011/0015791 A1 | 1/2011 | Smirnov et al. |
| 2011/0108126 A1 | 5/2011 | Monkowski et al. |
| 2011/0137581 A1 | 6/2011 | Chung et al. |
| 2011/0137582 A1 | 6/2011 | Chung et al. |
| 2011/0137583 A1 | 6/2011 | Chung et al. |
| 2011/0247390 A1 | 10/2011 | Smirnov et al. |
| 2011/0320162 A1 | 12/2011 | Kah |
| 2012/0132291 A1 | 5/2012 | Monkowski et al. |
| 2012/0204979 A1 | 8/2012 | Pan |
| 2012/0304781 A1 | 12/2012 | Monkowski et al. |
| 2014/0069527 A1 | 3/2014 | Mudd et al. |
| 2014/0260513 A1 | 9/2014 | Smirnov et al. |

(56) References Cited

U.S. PATENT DOCUMENTS

| | | |
|---|---|---|
| 2014/0366952 A1 | 12/2014 | Monkowski et al. |
| 2014/0367596 A1 | 12/2014 | Monkowski et al. |

FOREIGN PATENT DOCUMENTS

| | | |
|---|---|---|
| CN | 101115919 A | 1/2008 |
| CN | 101978132 A | 2/2011 |
| CN | 102687087 A | 9/2012 |
| CN | 101978132 A | 4/2015 |
| CN | 104615157 A | 5/2015 |
| CN | 102687087 B | 8/2016 |
| DE | 10314386 A1 | 10/2004 |
| EP | 2247819 A1 | 11/2010 |
| EP | 2488925 A1 | 8/2012 |
| JP | 60-62118 A | 4/1985 |
| JP | 60-62118 U | 5/1985 |
| JP | 62-141381 A | 6/1987 |
| JP | 2-163580 A | 6/1990 |
| JP | 3-14010 A | 1/1991 |
| JP | 4-72717 A | 3/1992 |
| JP | 6-138951 A | 5/1994 |
| JP | 11-223538 A | 8/1999 |
| JP | 11-338548 A | 12/1999 |
| JP | 2000-507681 A | 6/2000 |
| JP | 2001-502248 A | 2/2001 |
| JP | 2002-099330 A | 4/2002 |
| JP | 2002-200597 A | 7/2002 |
| JP | 2002-205022 A | 7/2002 |
| JP | 2003-028317 A | 1/2003 |
| JP | 2003-529218 A | 9/2003 |
| JP | 2006-038832 A | 2/2006 |
| JP | 2008-089607 A | 4/2008 |
| JP | 2009-294820 A | 12/2009 |
| JP | 2011-510404 A | 3/2011 |
| JP | 2013-508825 A | 3/2013 |
| JP | 2013-239201 A | 11/2013 |
| JP | 5654099 B2 | 11/2014 |
| JP | 2015-064893 A | 4/2015 |
| JP | 5971636 B2 | 7/2016 |
| KR | 10-2010-0114079 A | 10/2010 |
| KR | 10-2010-0095362 A | 8/2012 |
| TW | 200938978 A | 9/2009 |
| TW | 201115292 A1 | 5/2011 |
| TW | I399627 B1 | 6/2013 |
| TW | I435196 B | 4/2014 |
| WO | 2006/014508 A2 | 2/2006 |
| WO | 2007/008509 A2 | 1/2007 |
| WO | 2008/064044 A1 | 5/2008 |
| WO | 2008/129783 A1 | 10/2008 |
| WO | 2009091935 A1 | 7/2009 |
| WO | 2011047361 A1 | 4/2011 |

OTHER PUBLICATIONS

Restriction Requirement in U.S. Appl. No. 14/475,494 dated Oct. 27, 2015.
Office Action for U.S. Appl. No. 14/475,494 dated Jan. 22, 2016.
Notice of Allowance for U.S. Appl. No. 14/475,494 dated Aug. 2, 2016.
Office Action in U.S. Appl. No. 12/634,568 dated Mar. 9, 2012.
Notice of Allowance in U.S. Appl. No. 12/634,568 dated May 29, 2012.
Office Action in U.S. Appl. No. 12/634,593 dated Mar. 12, 2012.
Notice of Allowance in U.S. Appl. No. 12/634,593 dated May 18, 2012.
Office Action in U.S. Appl. No. 12/634,629 dated Mar. 12, 2012.
Notice of Allowance in U.S. Appl. No. 12/634,629 dated May 11, 2012.
Office Action in U.S. Appl. No. 13/306,940 dated Jan. 7, 2015.
Office Action for U.S. Appl. No. 13/306,940 dated Aug. 27, 2015.
Notice of Allowance for U.S. Appl. No. 13/306,940 dated Mar. 23, 2016.
International Search Report and Written Opinion for PCT/US2016/041581 dated Oct. 4, 2016.
"Fundamentals of Mass Flow Control: Critical Terminology and Operation Principles for Gas and Liquid MFC's", Advanced Energy, White Paper, Advanced Energy Industries, Inc., 2005, 5 pages.
Restriction Requirement in U.S. Appl. No. 12/354,723 dated Mar. 10, 2010.
Office Action in U.S. Appl. No. 12/354,723 dated Apr. 21, 2010.
Notice of Allowance in U.S. Appl. No. 12/354,723 dated Jun. 29, 2010.
International Search Report and Written Opinion in International Application No. PCT/US2009/031170 dated Mar. 23, 2009.
International Preliminary Report on Patentability in International Application No. PCT/US2009/031170 dated Jul. 29, 2010.
First Office Action in Chinese Patent Application No. 200980109390.3 dated Dec. 17, 2012.
Second Office Action in Chinese Patent Application No. 200980109390.3 dated Sep. 29, 2013.
Third Office Action in Chinese Patent Application No. 200980109390.3 dated May 16, 2014.
Fourth Office Action in Chinese Patent Application No. 200980109390.3 dated Nov. 13, 2014.
Notice of Refusal in Japanese Patent Application No. 2010-543262 dated Jan. 29, 2013.
Decision of Rejection for Japanese Patent Application No. 2010-543262 dated Oct. 1, 2013.
Office Action in Korean Patent Application No. 2010-7018060 dated Feb. 5, 2015.
Office Action for Korean Patent Application No. 2010-7018060 dated Jun. 23, 2015.
Office Action for Korean Patent Application No. 2010-7018060 dated Oct. 7, 2015.
Written Report of Re-Examination for Korean Patent Application No. 2010-7018060 dated Feb. 19, 2016.
Examination Report in Taiwanese Patent Application No. 98101722 dated Dec. 6, 2012.
Notice of Allowance in Taiwanese Patent Application No. 98101722 dated May 13, 2013.
Restriction Requirement in U.S. Appl. No. 12/355,654 dated Aug. 3, 2011.
Office Action in U.S. Appl. No. 12/355,654 dated Jan. 20, 2012.
Notice of Allowance in U.S. Appl. No. 12/355,654 dated Apr. 17, 2012.
Notice of Refusal in Japanese Patent Application No. 2013-156603 dated Apr. 15, 2014.
Decision of Grant for Japanese Patent Application No. 2013-156603 dated Oct. 21, 2014.
Restriction Requirement in U.S. Appl. No. 12/891,714 dated Oct. 12, 2012.
Office Action in U.S. Appl. No. 12/891,714 dated Nov. 15, 2012.
Notice of Allowance in U.S. Appl. No. 12/891,714 dated Jun. 26, 2013.
Notice of Allowance in U.S. Appl. No. 12/891,714 dated Nov. 7, 2013.
Office Action for Japanese Patent Application No. 2014-234087 dated Dec. 8, 2015.
Decision of Grant for Japanese Patent Application No. 2014-234087 dated Jun. 14, 2016.
Office Action in U.S. Appl. No. 13/584,736 dated Nov. 20, 2013.
Notice of Allowance in U.S. Appl. No. 13/584,736 dated May 29, 2014.
Office Action in U.S. Appl. No. 12/906,058 dated Jan. 22, 2013.
Office Action in U.S. Appl. No. 12/906,058 dated Sep. 9, 2013.
Advisory Action in U.S. Appl. No. 12/906,058 dated Feb. 20, 2014.
Invitation to Pay Additional Fees in International Application No. PCT/US2010/052974 dated Dec. 28, 2010.
International Search Report and Written Opinion in International Application No. PCT/US2010/052974 dated Mar. 11, 2011.
International Preliminary Report on Patentability in International Application No. PCT/US2010/052974 dated Apr. 26, 2012.
Examination Report in European Patent Application No. 10 779 088.3 dated Oct. 30, 2013.

(56) References Cited

OTHER PUBLICATIONS

Office Action in Chinese Patent Application No. 201080046178.X dated Mar. 4, 2014.
Notification of the Division in Chinese Patent Application No. 201080046178.X dated Dec. 1, 2014.
Office Action for Chinese Patent Application No. 201080046178.X dated Jun. 17, 2015.
Office Action for Chinese Patent Application No. 201080046178.X dated Jan. 8, 2016.
Notice of Refusal in Japanese Patent Application No. 2012-534432 dated Jul. 15, 2014.
Decision of Refusal in Japanese Patent Application No. 2012-534432 dated Apr. 7, 2015.
Decision of Refusal for Japanese Patent Application No. 2012-534432 dated Apr. 12, 2016.
Notice of Rejection for Korean Patent Application No. 10-2012-7009624 dated Jun. 30, 2016.
Examination Report in Taiwanese Patent Application No. 99135139 dated Jun. 26, 2013.
Notice of Allowance in Taiwanese Patent Application No. 99135139 dated Mar. 5, 2014.
Office Action in U.S. Appl. No. 14/475,472 dated Jan. 22, 2016.
Office Action in U.S. Appl. No. 14/475,472 dated Aug. 18, 2016.

\* cited by examiner

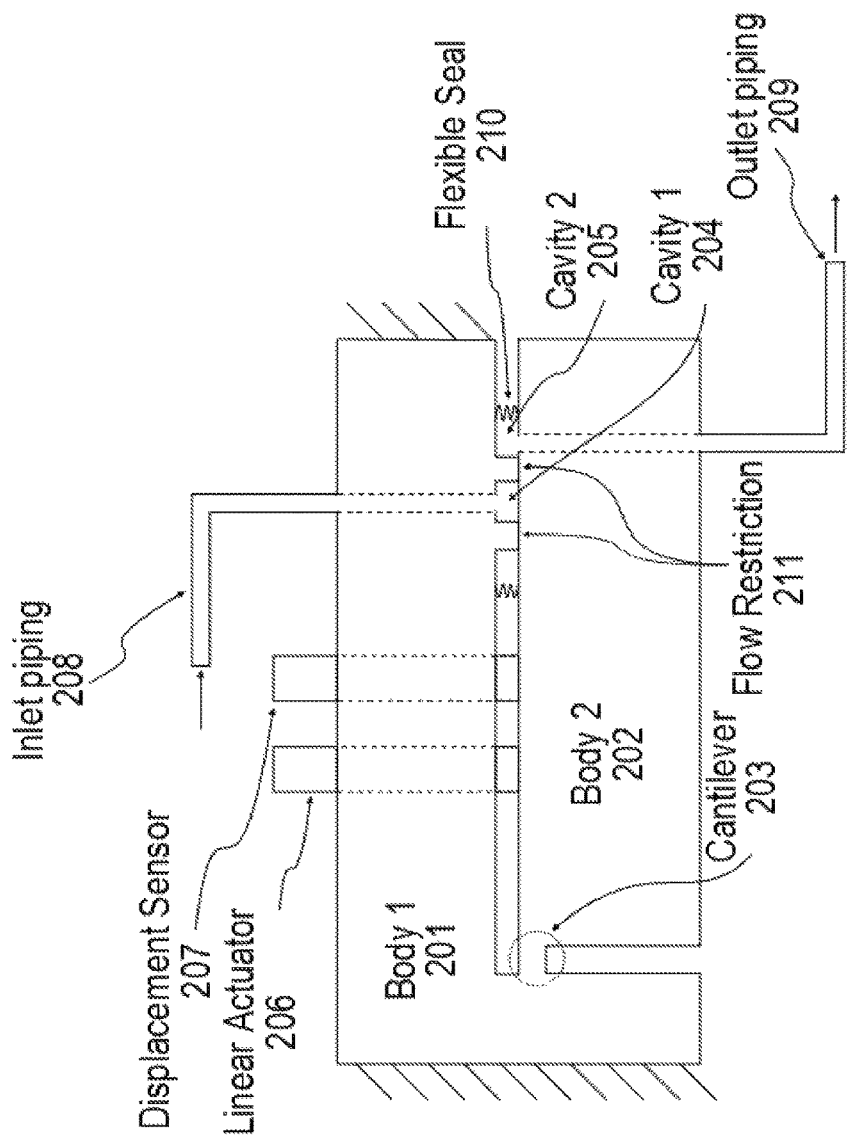

METHOD AND APPARATUS FOR GAS FLOW CONTROL

RELATED APPLICATIONS

This application is a divisional of U.S. patent application Ser. No. 14/475,494, filed Sep. 2, 2014, which is a divisional of U.S. patent application Ser. No. 12/906,058, filed Oct. 15, 2010, which claims priority benefit from U.S. Provisional Patent Application No. 61/252,143, filed Oct. 15, 2009, the disclosures of which are incorporated herein by reference in their entireties.

BACKGROUND

1. Field

This invention is in the field of fluid flow control and, more specifically the field of high accuracy flow control such as required for, e.g., semiconductor processing, plat panel display fabrication, solar cell fabrication, etc.

2. Related Art

Metering the mass-flow rate of a gas is important to many industrial processes. In the case of the semiconductor industry, metering must be especially accurate, because deviations in the flow rate of only several percent can lead to process failures.

Mass flow is the result of a pressure gradient existing in a system. As long as no external work is done on the system, mass will flow from areas of high pressure to low pressure. This is the working principle in all flow control devices. In order to control the rate of flow from the high pressure region to the low pressure region, a flow restriction is used. The flow restriction is positioned such that all flow in the system must pass through the restriction. Depending on the characteristics of the restriction, mass flow rate through the flow control device is a function of some or all of the following: dimensions of the flow restriction, the magnitude of the pressures both upstream and downstream of the flow restriction, the temperature of the system, and the physical properties of the gas, such as density and dynamic viscosity. The flow rate can be controlled by varying one or more of these parameters. In general, the physical properties of the gas and the temperature of the system are difficult to change or control, so flow is controlled by varying the pressures in the system, the dimensions of the flow restriction, or both.

The industry-standard flow control device is a mass flow controller (MFC) containing a flow restriction in the form of a valve that can be partially opened to allow increased flow or partially closed to decrease flow. The opening of the valve is controlled by a closed loop feedback circuit that minimizes the difference between an externally provided set point and the reading from an internal flow measuring device. The flow measuring device uses a thermal sensor with two resistance-thermometer elements wound around the outside of a tube through which the gas flows. The elements are heated by applying an electric current. As the gas flows through the tube, it picks up heat from the first element and transfers it to the second element. The resulting temperature differential between the two elements is a measure of the mass flow rate of the gas. In the newer, pressure insensitive MFCs, a pressure transducer is included between the thermal sensor and the control valve to account for the effects of changing pressure on flow.

A consequence of the thermal sensor flow measurement used in the MFC is that accurate flow control requires regular calibration of the device. Without regular calibration, the actual flow rate through the MFC can drift to unacceptable values due to errors in the flow measuring device. This calibration is often performed by flowing gas through the MFC into or out of a known volume and measuring the pressure rise or drop in the volume. The actual flow rate can be determined by calculating the rate of pressure rise or drop and using established pressure-temperature-volume gas relations. This type of measurement is known as a rate-of-rise calibration.

The rate-of-rise flow calibration is based on primary flow measurements, and is therefore a primary calibration standard—that is, flow is determined only by measurements of mass, pressure, volume, and time. There are only three types of known primary flow measurements: gravimetric, measuring the change in mass over time; volumetric, measuring the change in volume at constant pressure over time; and rate-of-rise, measuring the change in pressure at constant volume over time. All other types of flow measurement are secondary measurements and must be calibrated to a primary measurement.

Another method of metering the flow rate of a gas is to vary the pressure of the gas upstream of a critical orifice. The volume-flow rate of a gas through a critical orifice at constant temperature is independent of the upstream or downstream pressure, provided that certain pressure requirements are met, e.g., the upstream pressure is twice that of the downstream pressure. By controlling the density of the upstream gas, which is proportional to pressure, the mass-flow rate through the critical orifice can be controlled.

In this type of flow control, the pressure is controlled using a control valve in a closed loop control circuit with a pressure transducer positioned between the control valve and the critical orifice. The control valve is opened or closed to maintain a specified pressure upstream of the critical orifice. Mass flow rate is determined from the pressure upstream of a critical orifice and the established characteristics of the critical orifice. Accurate flow metering, therefore, is dependent not only on the performance of the pressure controlling system, but also on the mechanical integrity and stability of the dimensions of the orifice. Since the orifice is susceptible to being restricted with particulate contamination or eroded with reaction by the gases flowing through it, it is desirable to calibrate the pressure-flow relationship on a regular basis. This is performed using the same rate-of-rise measurement that is used for the MFC.

Both of the above mentioned methods control mass flow using a closed loop control scheme in which mass flow is ultimately the result of a pressure gradient acting across a flow restriction. Viewed as a control system, the output variable of these devices is mass flow, and the input variables are pressure and flow restriction characteristics.

In the case of the MFC, it controls the dimensions of the flow restriction based on a second-order measurement of mass flow rate. The actual dimensional characteristics of the flow restriction are unknown, but can be adjusted proportionally to increase or decrease flow restriction as desired. In terms of the process variables, flow restriction and pressure, only pressure is observable by the device (for the pressure-insensitive MFCs), and only the flow restriction can be controlled.

The critical orifice device controls flow by monitoring and controlling the upstream pressure while maintaining presumably constant flow restriction characteristics. The critical orifice device does not monitor or control the characteristics of the flow restriction beyond assuming they are constant. In terms of process variables, pressure is both observable and controllable by the device, while flow restriction is not controllable or observable. It is true that without any external influence, the characteristics of the flow restriction should not vary with time; however, in operation, the possibility exists for either chemical or mechanical perturbation of the flow restriction. This type of perturbation cannot be measured by the system, and therefore, cannot be corrected without the aid of an external calibration.

The shortcomings of both of these flow control schemes, especially the need for external measurements for calibration and detection of faults, illustrate why an improved flow control scheme is desirable.

A key requirement of a flow control device that is able to detect faults in its operation as well as to correct those faults through self-calibration is that there be a sufficient number of process variables that are observable and controllable. For both types of flow control devices described above, which together comprise the vast majority of flow control devices used in the semiconductor industry, there are not sufficient process variables to accomplish these tasks.

In the present invention, these process variables are added by implementing a control valve that is designed to provide a highly accurate and repeatable mapping between its position and its flow restriction characteristics, and is able to achieve a very accurate measurement and control of its position.

If the flow restriction can be controlled and also measured, the only additional input necessary to control the flow rate is knowledge of the pressure gradient acting on the flow restriction, because flow conductance is a knowable, repeatable function of the flow restriction dimensions. This control scheme is similar to that of the critical orifice device, except the static flow restriction is replaced with one that is variable and measureable.

The benefits obtained through use of this controllable valve will depend on the type of flow control device in which it is implemented. For the critical orifice flow control device, substitution of the controllable valve for the critical orifice will remove the uncertainty of any change to the dimensions of the critical orifice. For the thermal sensor MFC, since the combination of the pressure transducer and controllable valve provides a known flow rate, this flow rate can be checked against the flow rate measured by the thermal sensor, where any discrepancy is noted as a fault.

Neither of these flow control device types, however, allows self-calibration during operation. For that capability, the flow control device must incorporate a primary flow measurement as an integral part of its operation. Incorporating this type of control valve into the flow monitoring system shown in FIG. 1 yields a flow control device that is highly accurate and self-calibrating. Initially, the position of the control valve 108, which determines the flow restriction, would be controlled based on a rate-of-drop flow measurement carried out with valve 106 fully closed. Following the rate-of-drop measurement, valve 106 would be opened and flow would be controlled by adjusting the position of the control valve based on the pressure in the system as measured with pressure transducer 112.

A flow restriction with measurable, controllable dimensions is a key piece to a greatly improved flow control scheme, which can ultimately lead to a flow control device that is self calibrating and does not rely on secondary flow measurements. The technological challenges in making this type of control valve that is accurate enough for the semiconductor industry become apparent from an order-of-magnitude estimate of the precision required. The mass flow accuracy currently required for semiconductor processing equipment is +/−1%. In general, flow must be controlled between 1 and 10,000 sccm (standard cubic centimeters per second), and the pressure difference between the flow restriction inlet and outlet is typically between 20 and 150 psi (pounds per square inch). If we imagine an illustrative flow restriction in the form of a rectangle with a static width of 10 mm and a static length of 1 mm, with a 60 psi pressure drop across the restriction, the height must be adjusted to 0.8 um to allow flow of 1 sccm. Performing error propagation with the specification of +/−1%, the height must be controlled to within +/−1.1 nm.

In fact, except for high precision metering valves, which are not well suited for the cost, space, cleanliness, and reliability requirements of semiconductor manufacturing, very little work has been done to implement control valves with measureable and controllable restrictions. U.S. Pat. No. 6,761,063-B2, entitled "True Position Sensor for Diaphragm Valves," uses "a thin conductive member disposed between the diaphragm membrane and the actuator" to measure the capacitance between this conductive member and the valve body. The capacitance value provides an indication of the distance between the conductive member and the valve body, which gives an indication of the distance between the diaphragm and the valve body, which then gives an indication of the amount of valve opening. This type of assembly, with all of these separate parts, will at best provide control to a precision of approximately 0.001 inch, which is approximately 25,000 nm. In addition, the inventors note that the capacitance will change when fluid flows through the valve, thus making this approach even less appropriate for measuring the characteristics of the flow restriction to the level of accuracy needed in the present invention.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the present invention provide for a controllable flow restriction in which the dimensions of the flow restriction are measurable and controllable to a very high degree of precision. The measurement and control of the dimensions are precise enough that they can be used to accomplish the self-calibrating gas-flow-control scheme shown in FIG. 1 with the flow accuracy required by the semiconductor industry.

Embodiment of the invention provide an apparatus for controlling the flow of fluid, comprising: a first block having a flow restriction surface; a second block having a complementary flow restriction surface, wherein the flow restriction surface and the complementary flow restriction surface cooperate to form a flow restriction valve; a fluid inlet hole formed in one of the first block or second block and providing fluid passage to the flow restriction valve; a fluid outlet hole formed in one of the first block or second block and providing fluid passage to the flow restriction valve; a seal provided about the flow restriction valve; and, wherein a change in the amount of the flow restriction valve opening is effected by elastic flexure of at least one of the first block or second block.

Embodiments of the invention also provide for a system for precision gas delivery, comprising: a flow control valve;

a pressure transducer measuring gas pressure upstream of the flow control valve; a temperature sensor; a flow regulator positioned upstream of the flow control valve; a conduit coupling the flow regulator to the flow control valve; and, a controller receiving signals from the pressure transducer and temperature sensor and controlling the operation of the flow control valve according to flow calculation; wherein the flow control valve comprises an actuator varying the amount of gas flow by elastically flexing a body part of the flow control valve.

Embodiments of the invention also provide for a method for controlling flow rate through gas delivery system having a flow control valve, a flow regulator, and a known gas confinement volume coupled between the flow regulator and the flow control valve; comprising: actuating the flow control valve to deliver a desired flow rate; temporarily interrupting gas flow through the flow regulator; measuring temperature of the gas; measuring pressure drop of the gas within the known volume; using the measured temperature, pressure drop and known volume to calculate flow rate through the flow control valve; resuming flow through the flow regulator; and, using calculated flow rate to adjust the flow through the flow control valve by activating an actuator to cause elastic flexure of a body part of the flow control valve.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 2 is a simplified schematic diagram of an embodiment of an apparatus in accordance with the present invention for a high precision controllable flow restriction, while

FIGS. 2B-2D illustrate examples for modifications of the embodiment of FIG. 2, while

DETAILED DESCRIPTION

Embodiments of the present invention provide for a controllable flow restriction in which the dimensions of the flow restriction are measurable and controllable to a very high degree of precision. The measurement and control of the dimensions are precise enough that they can be used to accomplish the self-calibrating gas-flow-control scheme shown in FIG. 1 with the flow accuracy required by the semiconductor industry.

In various embodiments of the present invention, this level of precision is obtained by incorporating the following characteristics:

1. Uniaxial motion of the two opposing faces of the flow restriction, where transverse and/or rotational motion in the other two axes is limited to less than approximately 1 nm;
2. Measurement of motion in the uniaxial dimension to a precision of approximately 1 nm;
3. Actuation of motion with resolution of approximately 0.1 nm.

Figure 2:
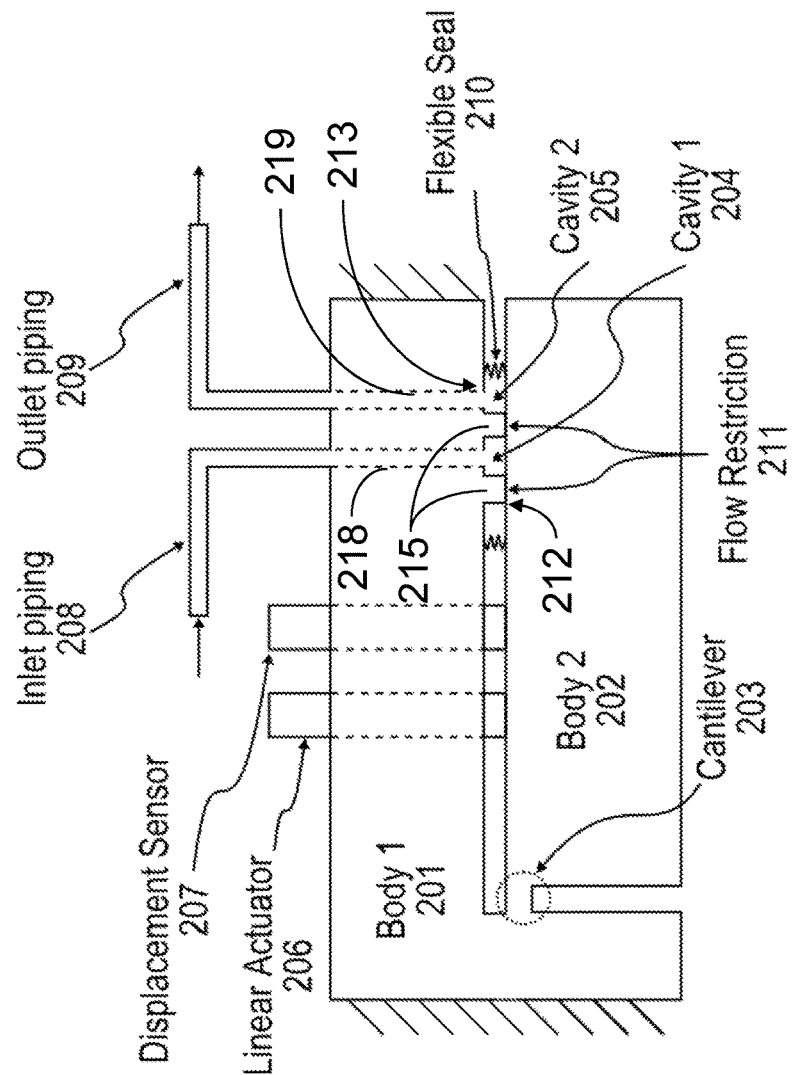

An illustrative embodiment of the invention, shown in FIG. 2, consists of two adjacent bodies 201 and 202 with a planar contacting area that forms the flow restriction valve 211. That is, the first block 201 has a flow restriction surface 213 and the second block 202 has a complementary flow restriction surface 212. The flow restriction surface 213 of the first block 201 cooperates with the complementary flow restriction surface 212 of the second block 202 to thereby form flow restriction valve 211. In the embodiment of FIG. 2, the flow restriction valve 211 is formed by an annular extension 215 formed on the flow restriction surface 213 of block 201, thereby defining hole 216 (see, FIG. 3). Conversely, the complementary flow restriction surface 212 is machined to be flat so as to form a perfect seal when urged against the annular extension 215.

The first body or block 201 is static in space, and the second body or block 202 is coupled to the first with a cantilever 203. The cantilever is positioned so that the motion of the second body with respect to the first at the planar contacting area is essentially uniaxial and very predictable and reproducible. The planar faces of the bodies are patterned to form two separate cavities 204 and 205 that are isolated from each other when the two bodies are contacting, but are coupled by a flow restriction valve 211 when the bodies are displaced from each other.

Figure 2A:
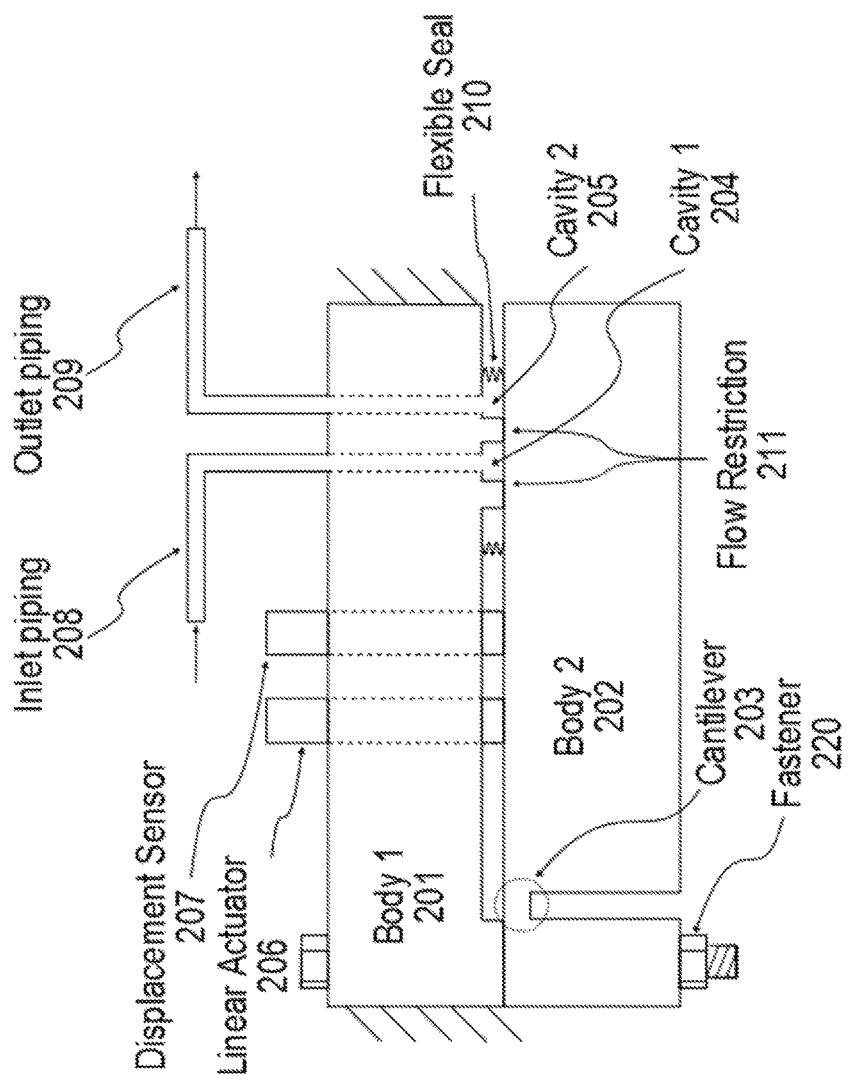
FIG. 2A illustrates an alternative embodiment.

In FIG. 2, bodies 201 and 202 are machined from a single piece of material, such as, e.g., stainless steel. Of course, any material that is compatible with the gas being used and allows reliable and repeatable flexure at the cantilever could be used. For example, alternative materials include other types of steel, Inconel, Hastelloy, etc. It is noted, however, that when made from one solid piece of material, it would be difficult to machine the valve surfaces. Therefore, FIG. 2A illustrates an alternative embodiment, wherein bodies 201 and 202 are fabricated from two pieces, so that the machining becomes very straightforward. Of course, the one or both bodies 201 and 202 may be made from more than one single piece. The most typical way to fasten the pieces together is with fastener 220, such as, e.g., bolts, but they could also be glued or welded together. The main requirement for the fastening is that there should be no movement at the location of the fastening, but it should allow for uniaxial movement at the flow restriction area. As both embodiments of FIGS. 2 and 2A would operate the same, the following description proceeds as applicable to either embodiment.

An actuator 206 is installed in the first body 201 which acts on the second body 202 to induce displacement of the second body, and therefore change the flow restriction dimension. That is, as the actuator expands or contracts, it causes an elastic flexure in body 202 about the cantilever 203. This is similar to what is sometimes referred to as flexure bearing, wherein the motion is caused by elastic flexure or deformation of the material forming the flexure bearing. Since the motion is elastic deformation, it is very precise and controllable. Also, when relaxed, the apparatus inherently assumes its natural position due to the elastic nature of the deformation. The displacement sensor 207 is installed in the first body to measure this displacement. In one embodiment, this is accomplished using a capacitive measuring device, or displacement sensor, which can measure linear displacements on the order of one nanometer.

A closed loop control circuit is formed with the output of the sensor 207 and the action of the actuator 206 to accomplish control of the flow restriction 211 dimensions, and consequently, the flow conductance coupling the two cavities. Piping 208 and 209 is incorporated into the system such that gas flow is directed through hole 218 into one cavity and out of the other cavity 205 through hole 219 to pipe 209, such that all flow must pass through the flow restriction valve 211 defined by the two bodies.

By coupling the two bodies that form the flow restriction with a cantilever, as opposed to mechanical hinges or sliding assemblies, mechanical play and hysteresis are eliminated because friction sources are eliminated. Also, during actuation, there is negligible elastic deformation within the two bodies; elastic deformation is isolated to the cantilever coupling the two bodies. Both planes which define the flow restriction, therefore, are rigid.

As depicted in FIGS. 2 and 2A, body 202 is positioned as close as possible to body 201, thus closing the flow restriction 211. According to one embodiment, the two bodies 201 and 202 are constructed such that when they are coupled together via the fastener, the two bodies are urged against each other so as to close the flow restriction 211. A flexible seal 210 is provided about the flow restriction 211, so as to prevent gas flow to the atmosphere. Also, according to one embodiment, the seal 210 is constructed such that it is in tension and serves to pull the two bodies 201 and 202 together to cause the flow restriction 211 to be closed. In this particular figure, the linear actuator 206, which is secured in body 201 and pushes against body 202, is in its relaxed state. When the linear actuator 206 is activated, it pushes against the tension of the flexible seal 210, moving body 202 away from body 201, forcing body 202 to pivot on the cantilever 203 and consequently allowing the flow restriction 211 to open up. It should be appreciated that the actuator 206 may be attached to body 202 and press against body 201.

Figure 3:
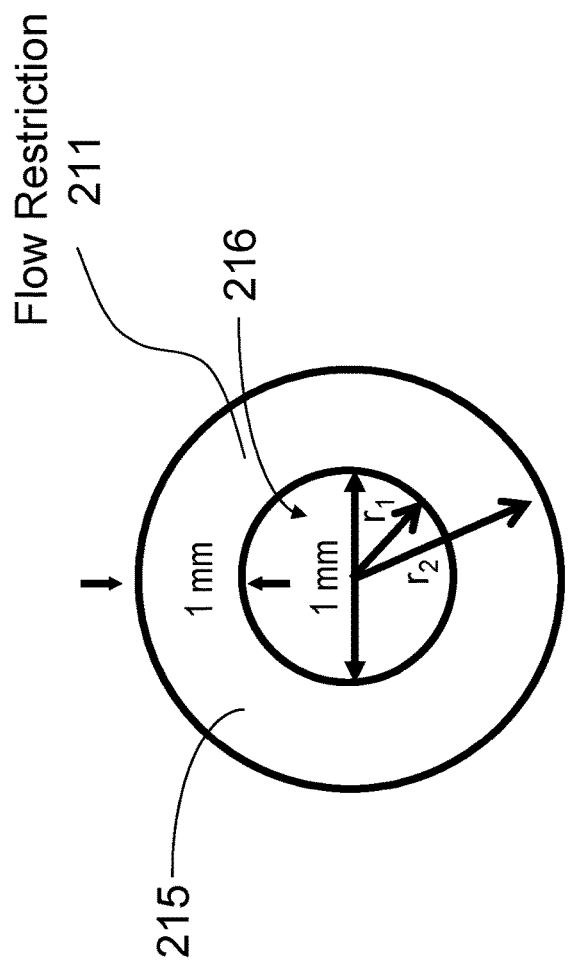
FIG. 3 is a simplified schematic diagram showing the details of the flow restriction.

This flow restriction 211, as viewed from the top, forms a circle as shown in FIG. 3, where the inside dimension of the flow restriction 211 is $r_1$ and the outside dimension is $r_2$. Gas flow is from the inside of the flow restriction 211, across the flow restriction 211, to the outside of the flow restriction 211. That is, with reference to FIG. 4, gas flows from inlet piping 208, to cavity 204, to cavity 205 (when the flow restriction 211 is open) and, since it's blocked by seal 210, proceeds to outlet piping 209. Consequently, when the two bodies 201 and 202 are closed against each other as shown in FIG. 2, the flow restriction 211 is closed, and no gas can flow. When the linear actuator 206 is activated, the flow restriction 211 opens up, and gas can flow from the inlet 208 to the outlet 209. In general, the flow of gas will increase as the flow restriction opens.

Since both body 201 and body 202 are rigid, and the only motion that can occur in the apparatus is flexure of the body at the cantilever 203, the movement of body 202 with respect to body 201 is very well defined. For small movements, where the opening of the flow restriction 211 is on the order of micrometers, which is much smaller than the distance between the flow restriction and the flexure, the movement of body 202 with respect to body 201 at the flow restriction will be essentially uniaxial in a direction perpendicular to the plane of the flow restriction 211. This well defined movement is critical for reproducible gas flow characteristics of the apparatus.

Figure 2C:
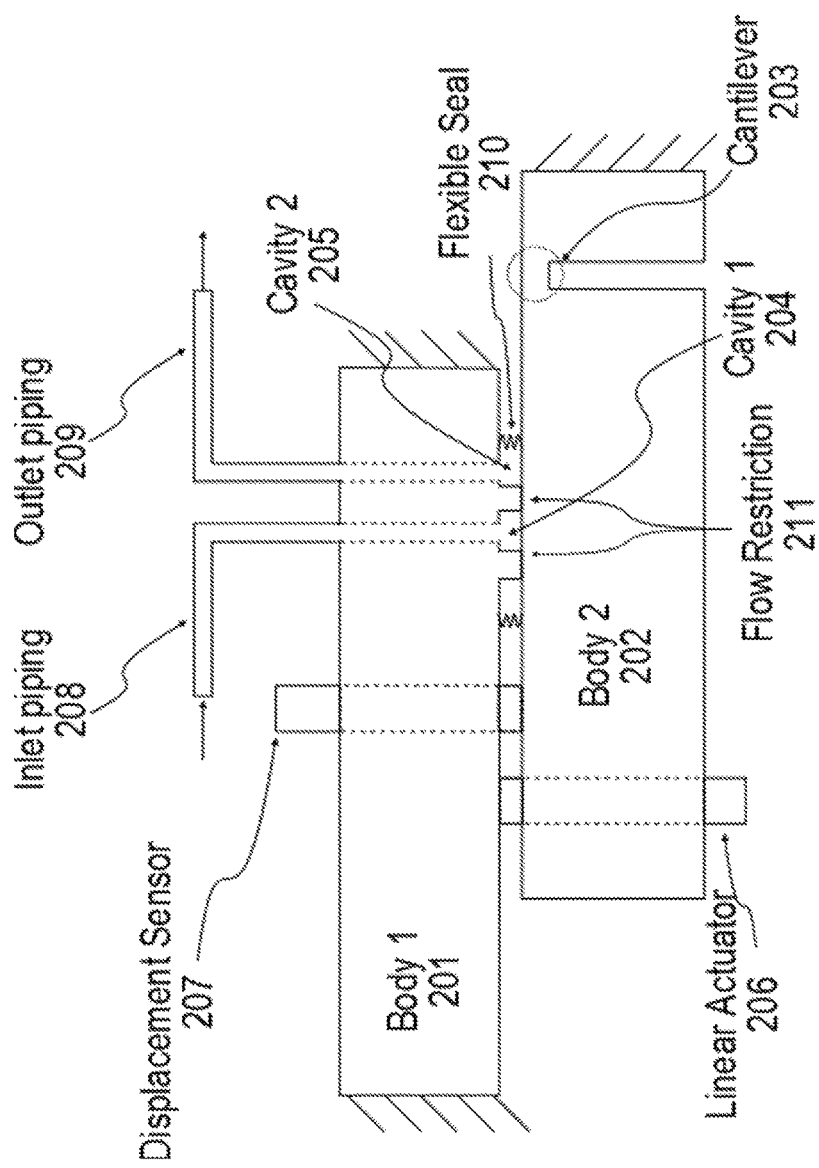

As can be appreciated, the embodiment of FIG. 2 is provided only as one illustration and it may be varied without detracting from its effectiveness. For example, FIG. 2B illustrates an embodiment wherein one body, here body 201, includes the hole for the gas inlet, while the other body, here body 202, includes the hole for the outlet. Of course, the reverse can also be done with the same result. FIG. 2C illustrates an embodiment wherein the two bodies are not connected to each other. Rather, body 201 is anchored and does not move, while body 202 is anchored independently via a cantilever arrangement, such that it can be elastically flexured to control the opening of the flow restriction.

Figure 2D:
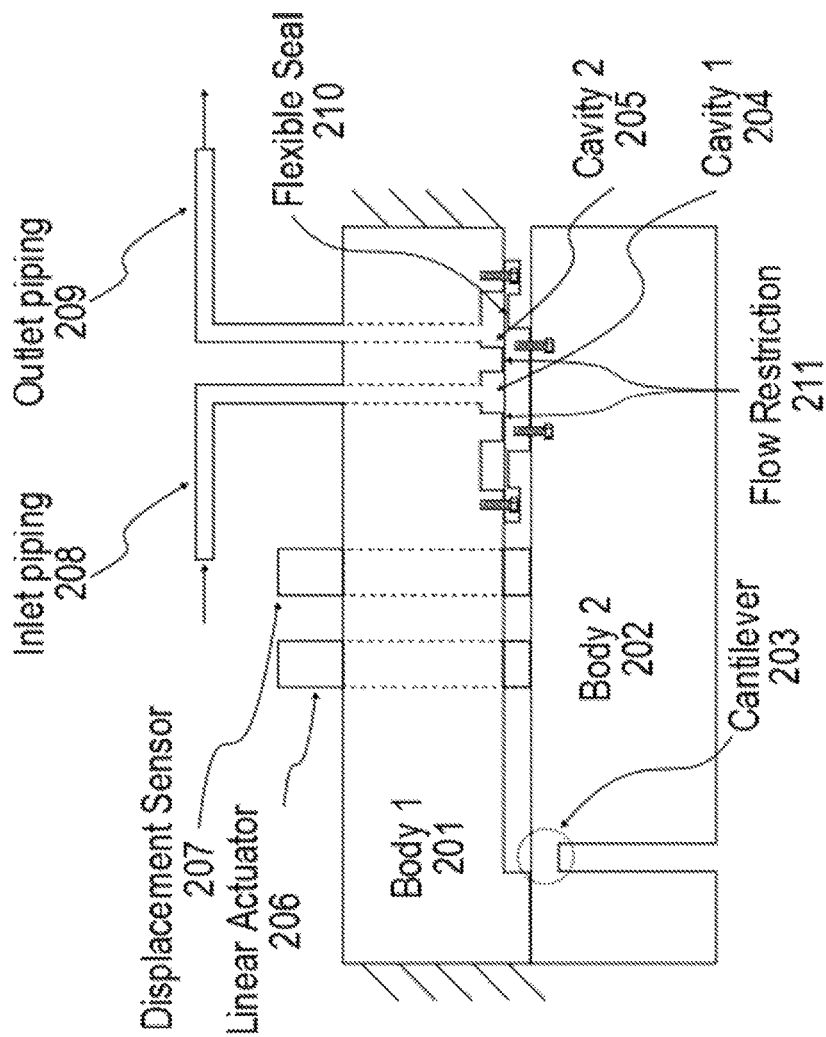
Figure 2E:
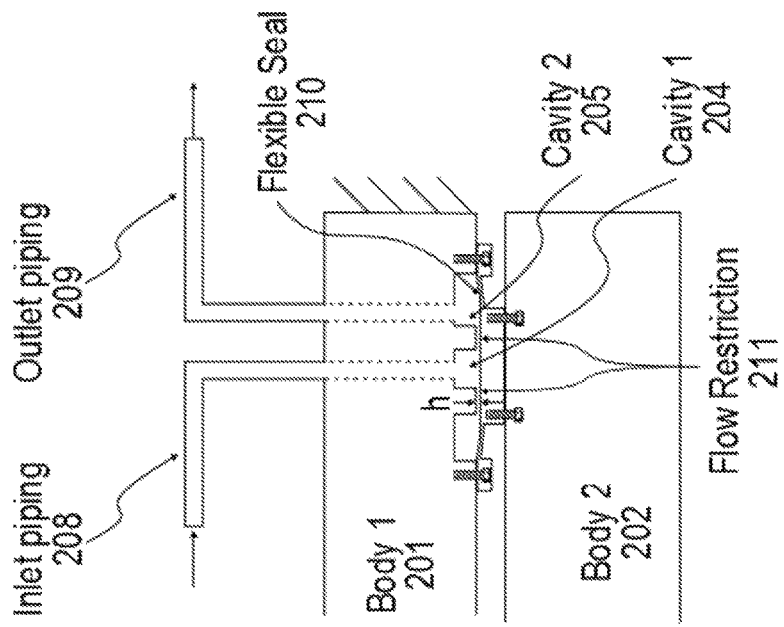
FIG. 2E illustrates an enlarged view of details of FIG. 2D.

Additionally, FIGS. 2D and 2E illustrate how the seal can be implemented such that it is also controlling the amount of flow through the valve. As shown in FIG. 2D and in the detail view of FIG. 2E, seal 210 is provided about cavities 204 and 205. Its periphery is fixedly attached to stationary body 201, while its central region is fixedly attached to flexure body 202. In this manner, when actuator 206 is actuated, it pulls on body 202, which in turn pulls on seal 210. Consequently, seal 210 elastically deforms such that it creates an opening of height "h" to enable gas to flow from cavity 204 to cavity 205.

Figure 2F:
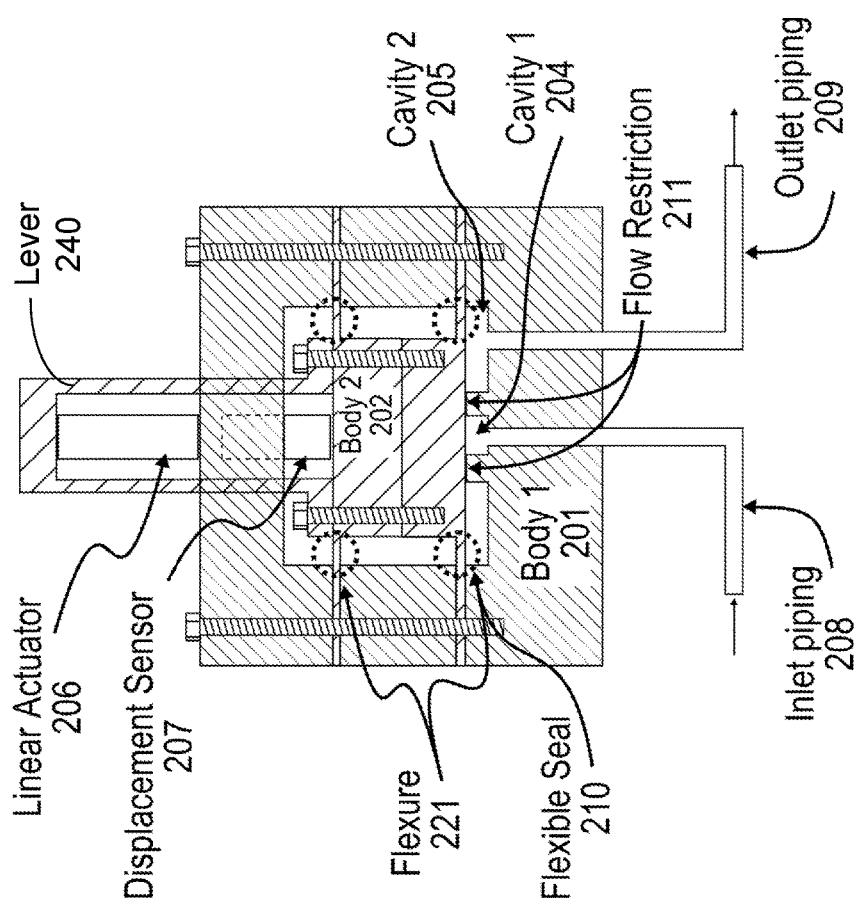
FIGS. 2F and 2G illustrate another embodiment of the invention.
Figure 2G:
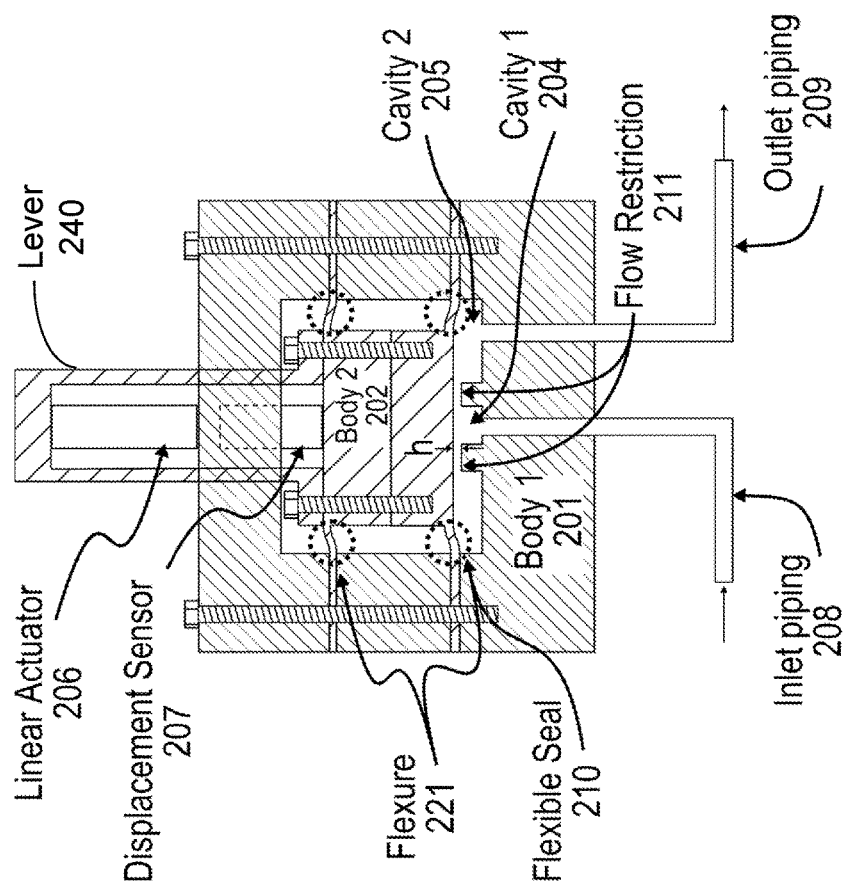

FIGS. 2F and 2G illustrate yet another embodiment of the invention, wherein FIG. 2F illustrates the closed, i.e., no flow condition, and FIG. 2G illustrates the open position. As shown, body 202 is joined to body 201 via flexures 221. In one embodiment, body 201 and body 202 are cylindrical and the flexure parts 221 are round disks extending from body 202 and may be machined from the same block as body 202 or maybe simply attached to body 202 by, e.g., welding. While other shapes are possible, circular shapes would provide uniform and balanced movement. In this embodiment, the lower flexure part 221 also functions as the seal 210, although it is clearly possible to provide a separate seal, such as with the other embodiments. Linear actuator 206 is provided between lever 240 and the top portion of body 201, such that when the actuator 206 expands, it raises the lever so as to raise body 202 and elastically flex the flexure parts of body 202, as illustrated in FIG. 2G. In the elevated position, the bottom surface of body 202, which forms the flow restriction surface, is raised a distance "h" from the complementary flow restriction surface of body 201, to thereby allow controlled fluid flow through the flow restriction valve 211. In this embodiment the two cylindrical flexures would limit relative motion between the bodies 201 and 202 to one degree of freedom (vertical), and would restrict rotation of the bodies with respect to each other in the plane of the page. This enables high accurate control of the fluid flow through the flow restriction 211.

Figure 4:
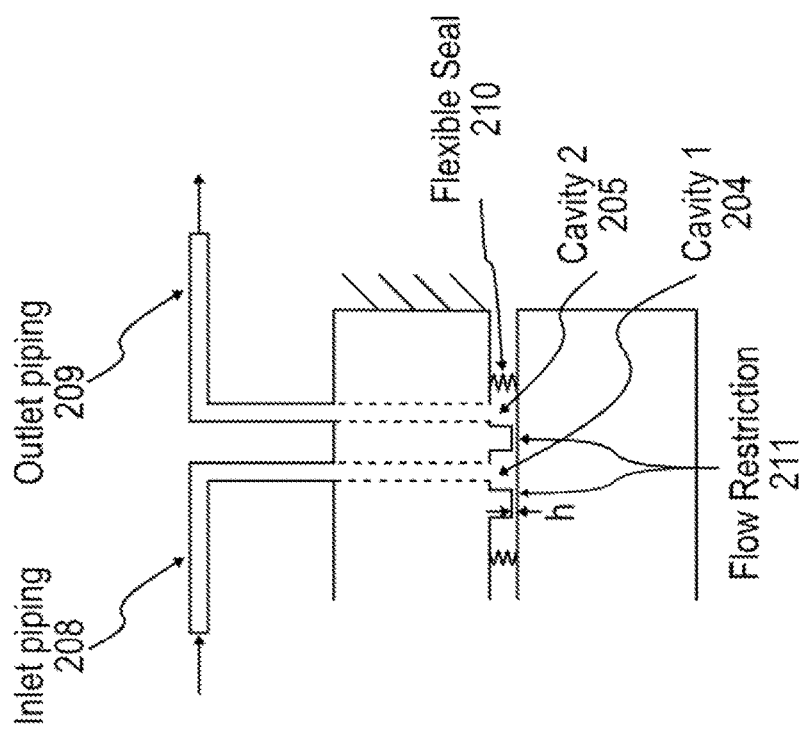
FIG. 4 is a simplified schematic diagram showing the embodiment of FIG. 2 with the flow restriction opened, where the amount of opening is designated by "h".

If we quantify the amount of flow restriction opening as "h", as shown in FIG. 4, we can write the following equation for the flow of gas as a function of the opening, h:

$$\text{Flow} = 2\pi P_{in}^2 h^3 / 3RT\mu \ln(r_1/r_2) \qquad \text{Equation (1)}$$

where
$P_{in}$ is the pressure of the gas at the inlet 208
R is the universal gas constant=1.986 calories per mol per K T is the absolute temperature in K μ is the viscosity of the gas and h, $r_1$, and $r_2$ are the dimensions shown in FIGS. 3 and 4.

For most gas flow applications, Equation (1), which describes laminar flow through the flow restriction, will provide a sufficiently accurate answer; however, for those cases where the downstream pressure, i.e., the pressure of the gas at the outlet 209, $P_{out}$, is sufficiently high compared to the pressure, $P_{in}$, at the inlet 208, the flow determined in Equation (1) must be multiplied by $\cos(\arcsin(P_{out}/P_{in}))$.

Figure 5:
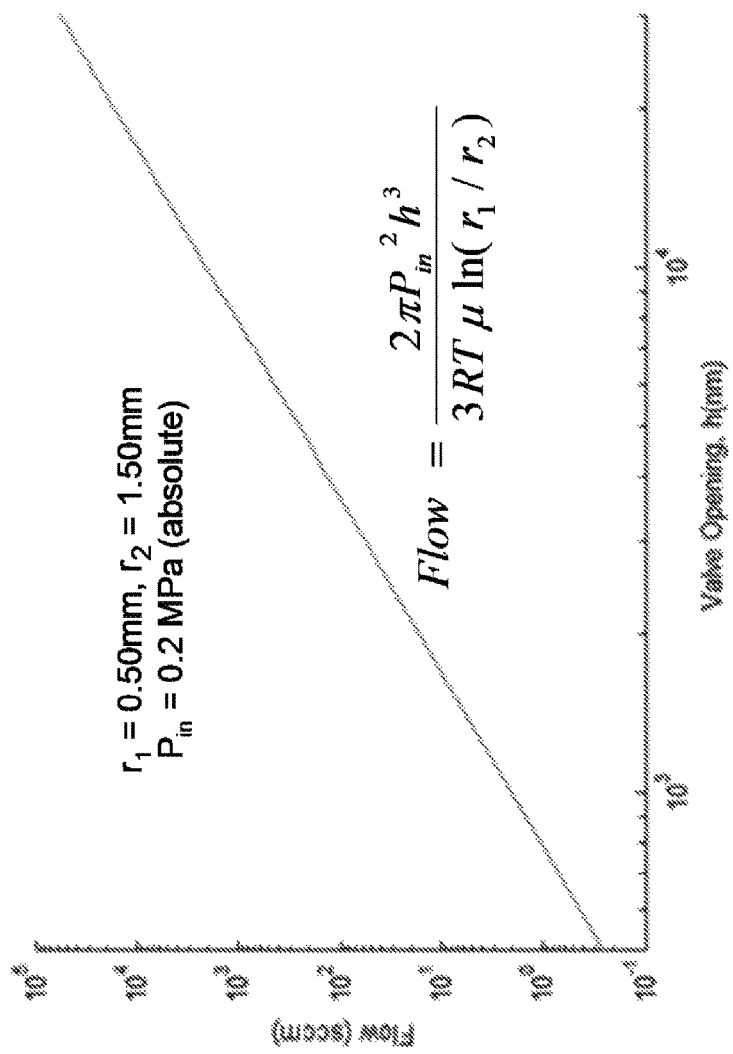
FIG. 5 is a graph showing the relationship between flow and the amount of flow restriction opening, h, for the specified inlet pressure and flow restriction radial dimensions.

FIG. 5 shows the gas flow for an inlet pressure of 0.2 MPa (approximately 30 psi), absolute. One of the advantages of the configuration of the restriction is that the flow is a function of the cube of the restriction opening, h. This means that one order of magnitude change in the amount of flow restriction opening can control three orders of magnitude of flow, giving the apparatus a very large range of flow rate control.

The linear actuator 206 can be of various types, such as a solenoid or piezoelectric actuator. A typical example is a piezoelectric actuator, part number P830.30, from Physik Instrumente, GmbH of Karlsruhe/Palmbach, Germany. The displacement sensor can also be of various types, such as a strain gauge or capacitance position sensor. A typical example is a capacitance position sensor, part number D510.050, also from Physik Instrumente.

Figure 6:
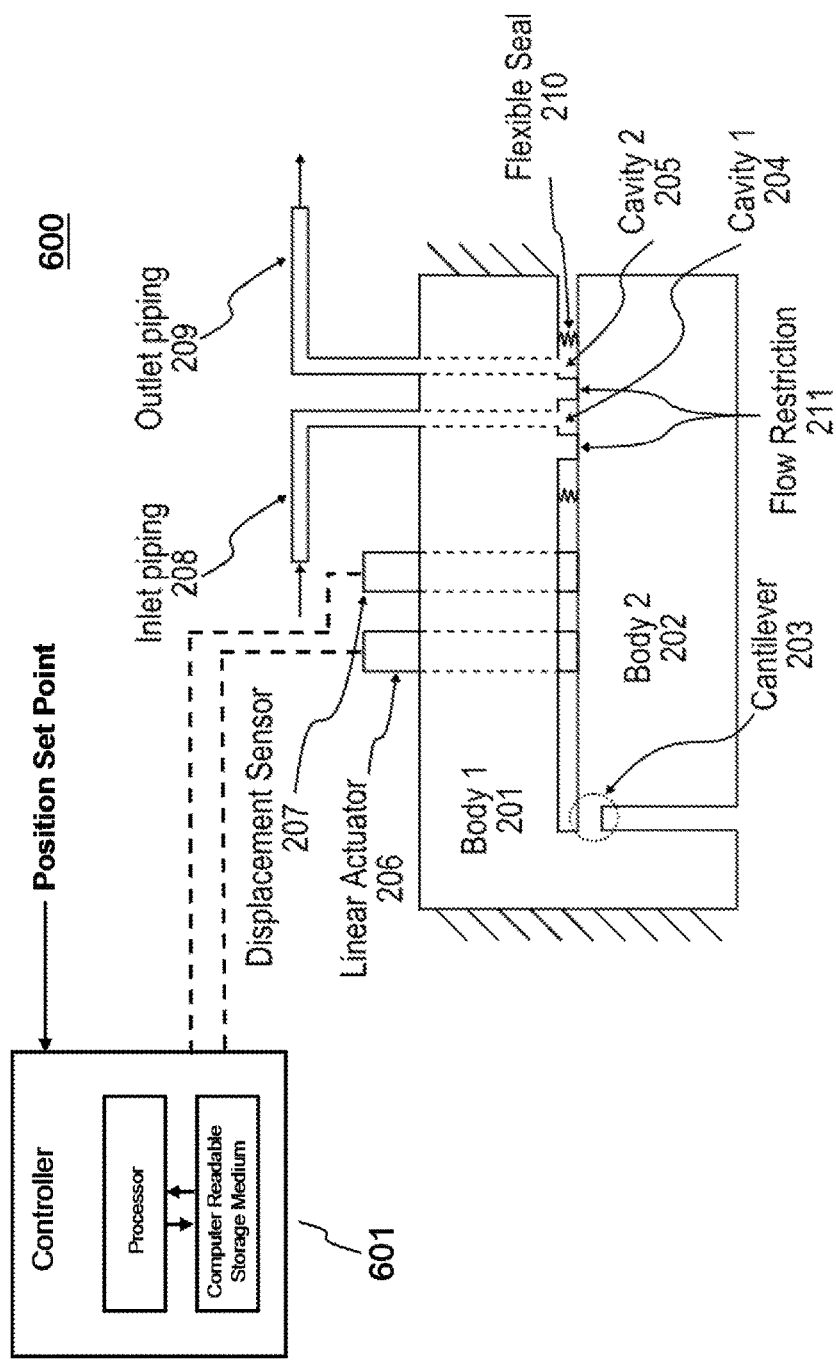
FIG. 6 is a simplified schematic diagram of an embodiment of an apparatus in accordance with the present invention for a high precision controllable flow restriction, including a processor and computer readable storage medium to control automatically the amount of flow restriction opening.

To be useful as a gas flow controller, the apparatus of FIG. 2 must have some means to control the amount of the flow restriction opening, h. FIG. 6 shows such an embodiment, with a controller 601 that measures the output of the displacement sensor, and using values stored in the computer readable storage medium, determines the amount of flow restriction opening, h. The controller then controls the linear actuator to move body 202 until the value indicated by the displacement sensor is consistent with the desired opening, i.e., the position set point. This control can be carried out with a standard control loop, such as a PID (proportional-integral-derivative) controller.

As indicated by Equation (1), in addition to the known values of h, $r_1$, and $r_2$, effective control of the gas flow rate also requires that $P_{in}$ and T be known. The determination of these parameters can be carried out with the apparatus shown in FIG. 1. In this embodiment, the apparatus 600 of FIG. 6 is represented by the control valve 108 of FIG. 1. The controller 601 of FIG. 6 is part of the control valve 108 of FIG. 1 and represents a control loop that is nested within the control loop of controller 120 of FIG. 1.

Figure 1:
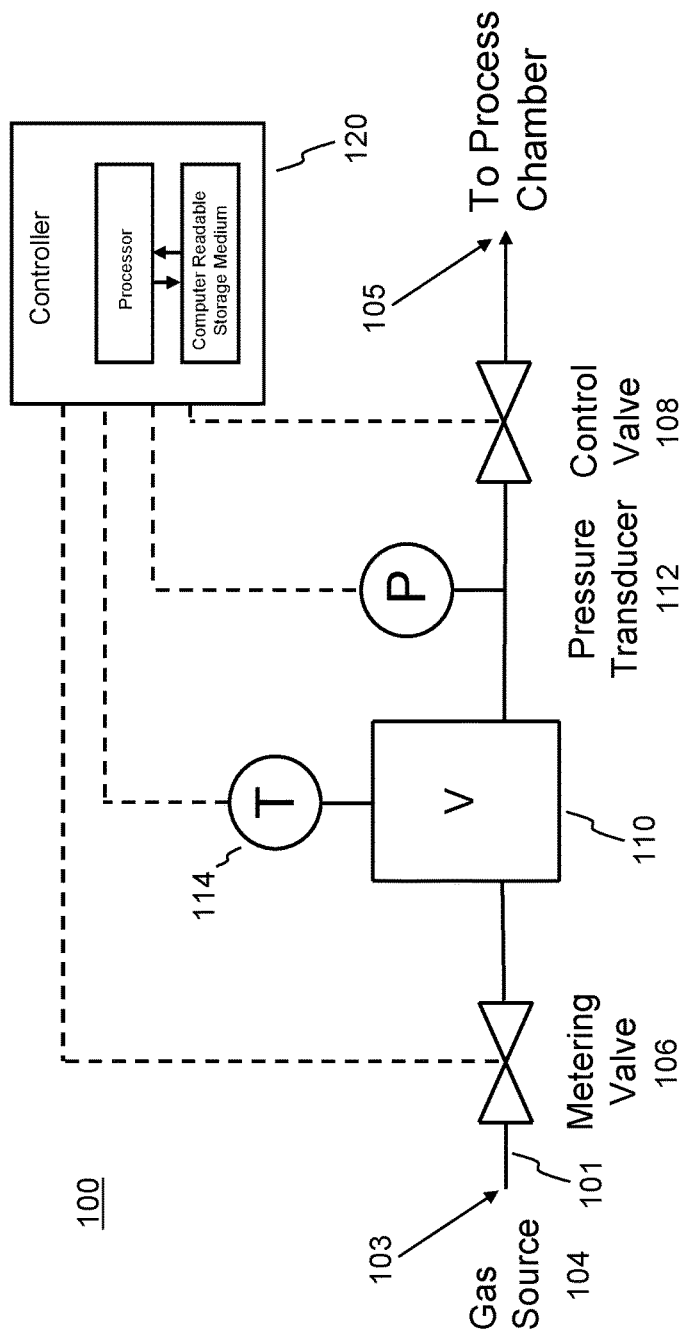
FIG. 1 is a simplified schematic diagram of an embodiment of an apparatus in accordance with the present invention for self-calibrating gas flow control.

The controller 120 of FIG. 1 has stored within its computer readable storage medium the values that allow it to determine the required amount of flow restriction opening, h, that is necessary to obtain the desired flow rate for a given gas pressure and temperature. The determination of the required opening can be carried out using an equation such as Equation (1) or alternatively, using a lookup table that is determined ahead of time by measuring the gas flow rate for a wide range of values of $P_{in}$, T, and h.

The gas flow controller of FIG. 1 has a sufficient number of observable and controllable parameters to be able to perform self-diagnostics and self-calibration. Furthermore, these self-diagnostics and self-calibration can take place while the gas flow controller is delivering gas at a desired flow rate to a process chamber.

As shown in FIG. 1, the apparatus comprises a gas line 101 having an inlet 103 in fluid communication with a gas source 104, and an outlet 105 in fluid communication with a process chamber (not shown). Under standard process conditions, the valve 106 would be open and gas would be flowing through the volume 110, through the control valve 108, and then ultimately into the process chamber.

The volume 110 represents the total fixed volume between the valve 106 and the control valve 108. A pressure transducer 112 is configured to measure the pressure in this volume V 110. A temperature sensor 114 is positioned to measure the temperature of the components. In certain embodiments, the sensor 114 may be a specialized sensor in direct thermal communication with one or more components. In other embodiments, where the environment is temperature-controlled and it is not expected that the temperature will vary greatly from place to place or time to time, a thermometer positioned near the gas delivery system will provide sufficient information regarding the temperature of interest.

The procedure for testing the flow of gas through the control valve 108 may be summarized as follows:

1. The control valve 108 is set to a desired flow rate, and a flow of gas is established.
2. The valve 106 is closed.
3. While the valve 106 is closed, the pressure is measured at regular periods, typically ranging from 1 to 100 milliseconds, by the pressure transducer.
4. After the pressure has dropped by some amount (typically 1-10% of the starting value), the valve 106 is opened, and the testing procedure concluded.
5. At some point during this measurement, the reading of the temperature sensor 114 is noted.

There is some amount of flexibility in the ordering of these steps; for example, steps 1 and 2 can be interchanged. Step 5 can be done at any time during the testing procedure.

Some elaboration on the valve 106 is warranted. In its simplest form, valve 106 would be an on/off shutoff valve. A potential disadvantage of this type of valve is that in step 4, when the valve is opened, there will be a rapid rise in pressure inside the volume V 110. This rapid rise in pressure might make it difficult for the control valve 108 to change the amount of flow restriction opening sufficiently fast to keep a constant flow of gas flowing to the process chamber. A good alternative to the shutoff valve is a metering valve (as indicated in FIG. 1), which is a valve designed to provide varying gas flow rates over a range of settings. When metering valve 106 is opened at the end of the measurement period, the controller controls the amount of valve opening such that the rise in pressure, as determined with pressure transducer 112, is maintained at a certain rate that is sufficiently low so that the flow through the control valve 108 is not perturbed. In other words, the opening of metering valve 106 is performed gradually rather than abruptly, so that the gas flow is not perturbed. Alternatively, rather than raising the pressure at all during the process step, the pressure could be held constant at the end of the measurement period and then raised once the process step was terminated. This approach would have the least effect on any perturbation of the flow rate through the control valve 108.

According to the ideal gas equation, the amount of gas in the volume V 110, is given by:

$$n = PV/RT, \qquad \text{Equation (2)}$$

where n=amount of gas (measured in moles)

P=pressure measured by the pressure transducer

V=volume of gas

R=ideal gas constant=1.987 calories per mol per K

T=absolute temperature in K.

To some extent, all real gases are non-ideal. For these non-ideal gases, Equation (2) can be rewritten as:

$n=PV/ZRT$, where  Equation (3)

Z=compressibility factor.

The compressibility factor can be found in various handbooks or it can be determined from experimental measurements for any particular gas, and is a function of temperature and pressure.

The flow rate of a gas can be written as the change in the amount of gas per unit time; i.e.:

flow rate=$\Delta n/\Delta t$,  Equation (4)

where t=time.

Substituting into Equation (4) from Equation (3), yields:

flow rate=$(\Delta P/\Delta t)V/ZRT$.  Equation (5)

The first factor ($\Delta P/\Delta t$) is merely the slope of the pressure measurements as a function of time taken in step 3 of the procedure above. Thus, taking these pressure measurements in conjunction with the volume, temperature, and the compressibility factor, the actual rate of flow of the gas through the control valve 108 can be determined according to embodiments of the present invention, thus providing two independent measurements of the gas flow rate into the process chamber.

One or more steps of the various embodiments of the present invention could be performed with manual or automatic operation. For example, the steps of opening/closing valves and taking pressure readings could be conducted automatically according to computer control. Alternatively, one or more of the various valves could be actuated manually, with the resulting flow rate calculated automatically from the detected pressure drop. Automatic operation of one or more steps could be accomplished based upon instructions stored in a computer readable storage medium, utilizing communication through control lines as indicated in FIG. 1.

Another benefit of this measurement system is that if a discrepancy is found between the desired flow rate and the measured flow rate, the setting of the control valve 108 can be changed to correct for the discrepancy and provide the desired flow rate. This type of correction is particularly appropriate considering that the pressure rate-of-drop measurement provides a primary calibration standard. This correction can be done in the same process step or in a subsequent process step. This type of correction is greatly simplified if the system is under computer control.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A gas flow control valve, comprising:
   a first body maintained static in space;
   a second body movably situated inside the first body;
   a flow restriction valve formed by a flow restriction surface provided on the first body and a complementary flow restriction surface formed on the second body;
   a lower flexure part extending from the second body and coupling the first body and the second body and a second flexure part positioned above the lower flexure part and coupling the first body and the second body, wherein the lower flexure part and the second flexure part limit relative motion between the first body and the second body, thereby permitting only uniaxial motion between the first body and the second body;
   a lever connected to the second body;
   an actuator provided between the lever and the first body, such that when the actuator expands, it raises the lever so as to raise the second body and elastically flex the lower and second flexure parts thereby inducing displacement between the first body and the second body; and,
   a displacement sensor installed to measure the displacement between the first body and the second body.

2. The gas flow control valve of claim 1, further comprising an annular extension machined to form a perfect seal between the flow restriction surface and the complementary flow restriction surface.

3. The gas flow control valve of claim 1, further comprising first cavity and a second cavity formed between the flow restriction surface and the complementary flat flow restriction surface, and wherein when the actuator is not energized, the flow restriction surface and the complementary flat flow restriction surface prevent fluid flow between the first cavity and second cavity.

4. The gas flow control valve of claim 1, further comprising inlet piping and outlet piping, and wherein the first cavity is coupled to the inlet piping and the second cavity is coupled to the outlet piping.

5. The gas flow control valve of claim 1, wherein the actuator is configured to induce displacement between the first body and the second body in a direction separating the flow restriction surface and the complementary flow restriction surface.

6. The gas flow control valve of claim 1, wherein the displacement sensor can measure linear displacements on the order of one nanometer.

7. The gas flow control valve of claim 1, wherein the displacement sensor is a capacitance position sensor.

8. The gas flow control valve of claim 1, further comprising a lookup table correlating required displacement and fluid flow through the flow control valve.

9. The gas flow control valve of claim 1, further comprising a closed loop control circuit formed with an output of the displacement sensor and action of the actuator.

10. The gas flow control valve of claim 1, further comprising a controller that measures output of the displacement sensor, and using values stored in a computer readable storage medium, determines an amount of flow restriction opening, and controls the linear actuator to move the second body until a value indicated by the displacement sensor is consistent with a desired opening.

11. The gas flow control valve of claim 10, wherein the controller executes proportional-integral-derivative control.

12. The gas flow control valve of claim 1, wherein when the actuator expands it causes deformation of the lower flexure part and the second flexure part, thereby causing uniaxial motion of the second body in a direction perpendicular to plane of the complimentary flow restriction surface.

13. The gas flow control valve of claim 1, wherein the actuator comprises a piezoelectric actuator.

14. The gas flow control valve of claim 1, further comprising a controller determining a required displacement using a lookup table that is predetermined by measuring gas flow rates for a wide range of values of input gas pressure, gas temperature, and displacement signal from the displacement sensor.

15. The gas flow control valve of claim 1, wherein the lower flexure part and second flexure part are configured to elastically deform when the actuator induces displacement between the first body and the second body.

16. The gas flow control valve of claim 1, wherein the displacement sensor measures the uniaxial motion with resolution of at least 1 nanometer.

17. The gas flow control valve of claim 1, wherein the actuator is configured to induce displacement between the first body and the second body with a resolution of at least 0.1 nanometer.

18. The gas flow control valve of claim 1, wherein the lower flexure part forms a seal shaped as a round disk.

19. The gas flow control valve of claim 1, wherein either the first or the second flexure part forms a seal.

20. The gas flow control valve of claim 1, wherein the actuator is provided between the lever and a top portion of the first body and the displacement sensor is installed on the first body.

* * * * *